(12) United States Patent
Mayerhofer

(10) Patent No.: US 12,552,307 B2
(45) Date of Patent: Feb. 17, 2026

(54) MEDIUM INSTALLATION OF A VEHICLE, EMPTYING DEVICE FOR A MEDIUM LINE, AND VEHICLE WITH THE MEDIUM INSTALLATION

(71) Applicant: Alexander Mayerhofer, Markt Taschendorf (DE)

(72) Inventor: Alexander Mayerhofer, Markt Taschendorf (DE)

( * ) Notice: Subject to any disclaimer, the term of this patent is extended or adjusted under 35 U.S.C. 154(b) by 0 days.

(21) Appl. No.: 18/586,663

(22) Filed: Feb. 26, 2024

(65) Prior Publication Data

US 2024/0343178 A1 Oct. 17, 2024

(30) Foreign Application Priority Data

Apr. 14, 2023 (DE) .................. 10 2023 109 511.0

(51) Int. Cl.
*B60R 15/00* (2006.01)
*B60P 3/22* (2006.01)
*B60R 16/08* (2006.01)
*B63B 29/16* (2006.01)

(52) U.S. Cl.
CPC ........... *B60P 3/2215* (2013.01); *B60P 3/2245* (2013.01); *B60R 16/08* (2013.01); *B63B 29/16* (2013.01); *Y10T 137/4259* (2015.04)

(58) Field of Classification Search
CPC ......... B63B 29/16; B60R 15/00; B60R 15/02; B60R 15/04; E03F 1/008; B64D 11/04; B67D 7/62; Y10T 137/4259; E03B 11/02
See application file for complete search history.

(56) References Cited

U.S. PATENT DOCUMENTS

| | | | | |
|---|---|---|---|---|
| 6,915,924 B1 * | 7/2005 | Noiseux | ................... | E03B 11/02 |
| | | | | 222/64 |
| 7,793,688 B1 * | 9/2010 | Gross, Jr. | ................ | F16K 11/22 |
| | | | | 137/893 |
| 9,809,962 B1 * | 11/2017 | Gehring | ..................... | E03F 9/00 |
| 10,590,634 B2 * | 3/2020 | Giamati | ................. | B64D 11/04 |
| 10,850,299 B2 * | 12/2020 | DiStefano | ................. | B05B 1/18 |

OTHER PUBLICATIONS

Bartosch, Jürgen: Tips for the correct emptying of the water system—this will prevent frost damage and germ Formation. In: Promobil Feb. 4, 2022: URL: https://www.promobil.de/tipps/wasserbedarf-anlage-entleerung-wohnmobil-einwintern/ (retrived on Nov. 7, 2023).

* cited by examiner

*Primary Examiner* — Kevin F Murphy
(74) *Attorney, Agent, or Firm* — Laurence A. Greenberg; Werner H. Stemer; Ralph E. Locher

(57) ABSTRACT

An emptying device for a medium line of a vehicle, such as a recreational vehicle, can be connected between a medium tank of the vehicle and the medium line to be emptied. A first non-return valve is arranged in a first connecting line between the medium tank and the medium line to be emptied and permits a flow of the medium from the medium tank into the medium line, but blocks a reverse flow. A second connecting line opens into the first connecting line downstream of the first non-return valve. The second connecting line, for emptying the medium line, can be connected to a pressure medium source and can be acted upon by the pressure medium in order to empty the medium line. There is also described a medium installation of a vehicle and a corresponding vehicle.

15 Claims, 1 Drawing Sheet

MEDIUM INSTALLATION OF A VEHICLE, EMPTYING DEVICE FOR A MEDIUM LINE, AND VEHICLE WITH THE MEDIUM INSTALLATION

CROSS-REFERENCE TO RELATED APPLICATION

This application claims the priority, under 35 U.S.C. § 119, of German Patent Application DE 10 2023 109 511.0, filed Apr. 14, 2023; the prior application is herewith incorporated by reference in its entirety.

FIELD AND BACKGROUND OF THE INVENTION

The invention relates to a medium installation of a vehicle, an emptying device for a medium line of the medium installation, and a vehicle with such a medium installation.

Vehicles, especially recreational vehicles such as coaches, RVs, motorhomes or recreational boats, usually have a medium installation with a medium tank and a medium line connected to it in a flow-conducting manner in addition to sleeping or living accommodation. The medium is, for example, a freshwater or wastewater and the medium line to be emptied is a freshwater or wastewater pipe.

The disadvantage of such medium lines, which are pipes, is that the water remaining in them can freeze over in winter when the outside temperatures drop below freezing, or pathogens can develop or spread due to stagnant water.

BRIEF SUMMARY OF THE INVENTION

The purpose of the present invention is to provide a medium installation and an emptying device for a medium line of a vehicle, and also a corresponding vehicle, which are improved compared to the prior art. In particular, an improved emptying of the medium line connected to the medium tank is to be disclosed.

With the above and other objects in view there is provided, in accordance with the invention, a medium installation for a vehicle, the medium installation comprising:
  a medium tank, a medium line fluidically connected to the medium tank, and a feed pump for supplying a medium from the medium tank through the medium line;
  an emptying device for selectively emptying the medium line, the emptying device being connected between the medium tank and the medium line;
  the emptying device having a first connecting line between the medium tank and the medium line to be emptied, and a first non-return valve in the first connecting line to permit a flow of a medium from the medium tank via the emptying device into the medium line and to block a reverse flow;
  the emptying device having a second connecting line which, viewed in a direction of flow of the medium from the medium tank towards the medium line, is fluidically connected to open into the first connecting line downstream of the first non-return valve; and
  a pressure medium source being a compressor to be connected to the second connecting line and to pressurize the second connecting line with a gaseous pressure medium and to empty the medium line by the pressure medium;
  the feed pump and the compressor being electrically connected to a DC circuit of the vehicle via a positive pole connection and a ground connection, and a changeover switch is connected in the ground connection of the feed pump and the pressure medium source in order to alternately interrupt the respective ground connection of the feed pump and the pressure medium source or to connect the respective ground connection to the DC circuit.

In accordance with a preferred embodiment of the invention, there is further provided a second non-return valve arranged in the second connecting line and configured to allow a flow of the pressure medium from the pressure medium source via the second connecting line in a direction of the medium line to be emptied, and to block a reverse flow.

With the above and other objects in view there is provided, in accordance with the invention, an emptying device for selectively emptying a medium line of a medium installation in a vehicle, the emptying device comprising:
  a first connecting line fluidically connected between a medium tank and the medium line to be emptied;
  a first non-return valve in said first connecting line to permit a flow of a medium from the medium tank via the emptying device into the medium line and to block a reverse flow of the medium from the medium line to the medium tank;
  a second connecting line which, viewed in a direction of flow of the medium from the medium tank towards the medium line to be emptied, is fluidically connected to open into said first connecting line downstream of said first non-return valve; and
  a pressure medium source being a compressor to be connected to said second connecting line and to pressurize said second connecting line with a gaseous pressure medium and to empty the medium line by the pressure medium;
  wherein a feed pump for feeding the medium and said pressure medium source are electrically connected to a DC circuit of the vehicle via a positive pole connection and a ground connection, and a changeover switch is connected in said ground connection of said feed pump and said pressure medium source in order to alternately interrupt the respective ground connection of said feed pump and said pressure medium source or to connect the respective ground connection to the DC circuit.

In an emptying device according to the invention for a medium line of a vehicle, such as a recreational vehicle, the emptying device can be connected between a medium tank of the vehicle and the medium line to be emptied, the emptying device having a first non-return valve, which is arranged or can be arranged in a first connecting line of the emptying device between the medium tank and the medium line to be emptied and is set up in such a way that it permits a flow of the medium from the medium tank via the emptying device into the medium line to be emptied, but blocks a reverse flow, wherein the emptying device comprises a second connecting line which, viewed in the direction of flow of the medium from the medium tank in the direction of the medium line to be emptied, opens into the first connecting line downstream of the first non-return valve and is connected thereto in a flow-conducting manner, wherein the second connecting line for emptying the medium line to be emptied can be connected to a pressure medium source and can be pressurized (acted upon) by means of the pressure medium in order to empty the medium line to be emptied by means of the pressure medium.

The emptying device according to the invention can therefore be easily retrofitted between the medium tank and the medium line connected to it. For this purpose, the medium line is first separated from the medium tank at its opening to the medium tank and the emptying device according to the invention is arranged between the two. Then the emptying device according to the invention is connected on the one hand to the medium tank and on the other hand to the mouth of the medium line via the first connecting line of the emptying device according to the invention in a flow-conducting manner.

The first non-return valve, or check valve, which is arranged in or assigned to the first connecting line, prevents the medium from flowing back into the medium tank as soon as pressurized medium is fed into the first connecting line via the second connecting line. The first non-return valve therefore ensures that the medium flows along the medium line from one end to the other and transports the medium still contained in the medium line to be emptied out of it. This means that a large volume of pressure does not have to be applied via the medium tank, for example, so that the components can all be significantly smaller, especially the pressure medium source.

A second non-return valve, or check valve, is arranged in the second connecting line, which allows the pressure medium to flow from the pressure medium source via the second connecting line in the direction of the medium line to be emptied, but blocks a reverse flow. This effectively prevents the medium from flowing towards the pressure medium source and possibly damaging it.

For example, the emptying device can be free of auxiliary energy apart from the pressure medium, and can only function mechanically and therefore have a comparatively simple design.

The emptying device comprises a housing that surrounds the first and second non-return valves and the first and second connecting lines. This results in a compact design of the emptying device according to the invention. The fact that all of the aforementioned components are accommodated in a single housing makes it particularly easy and convenient to convert existing vehicles, as the individual components do not have to be connected to each other separately.

The invention also relates to a medium installation of a vehicle, such as a recreational vehicle, wherein the medium installation comprises a medium tank and a medium line connected thereto in a flow-conducting manner, wherein the emptying device is connected between a medium tank of the vehicle and the medium line to be emptied and is designed in accordance with the invention.

The medium tank is a freshwater or wastewater tank and the medium pipe to be emptied is a freshwater or wastewater pipe.

The pressure medium source is preferably a compressor and the pressure medium is gaseous, in particular air. In this way, rapid emptying can be achieved by simple means.

The medium tank can have a feed pump and an outlet tap for the medium can be assigned to the medium line, whereby the feed pump can be actuated to dispense the medium via the outlet tap. Medium installations of this type can be found in common coaches and motorhomes, for example.

The feed pump and the pressure medium source are each connected via a positive pole line and an ground line to a direct voltage (DC) power supply of the vehicle for their electrical operation, whereby a changeover switch is arranged in the ground line of the feed pump and the pressure medium source in order to alternately interrupt or connect the respective ground line of the feed pump and the pressure medium source to the DC power supply. Alternately means that only the pressure medium source and not the feed pump (or vice versa) is connected to the ground line at the same time and that the two do not run together. The changeover switch is thus used to control the operating mode of the medium installation or the emptying device. If the changeover switch has been actuated in such a way that it connects the ground line of the feed pump to the vehicle's DC power supply, the pump is in operation and feeds medium from the medium tank via the emptying device and the medium line to be drained to the outlet tap, where the medium, e.g. water, can be removed. The feed pump and outlet tap are electrically connected to each other for this purpose, so that actuating the outlet tap manually closes an electrical circuit and starts the feed pump. On the other hand, if the changeover switch has been actuated in such a way that it connects the ground line of the compressor to the DC power supply of the vehicle, pressure medium from the compressor enters the medium line via the second and then via the first supply line in order to empty it by means of the pressure medium. The changeover switch therefore alternately disconnects and connects the ground lines of the feed pump and pressure medium source to the vehicle's DC power supply and switches them accordingly.

The invention also relates to a vehicle, such as a recreational vehicle, comprising a medium installation according to the invention.

The vehicle may be a leisure vehicle, such as an RV, a coach, a motorhome, or a recreational boat.

Other features which are considered as characteristic for the invention are set forth in the appended claims.

Although the invention is illustrated and described herein as embodied in an emptying device for a medium line as well as a medium installation of a vehicle and such a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
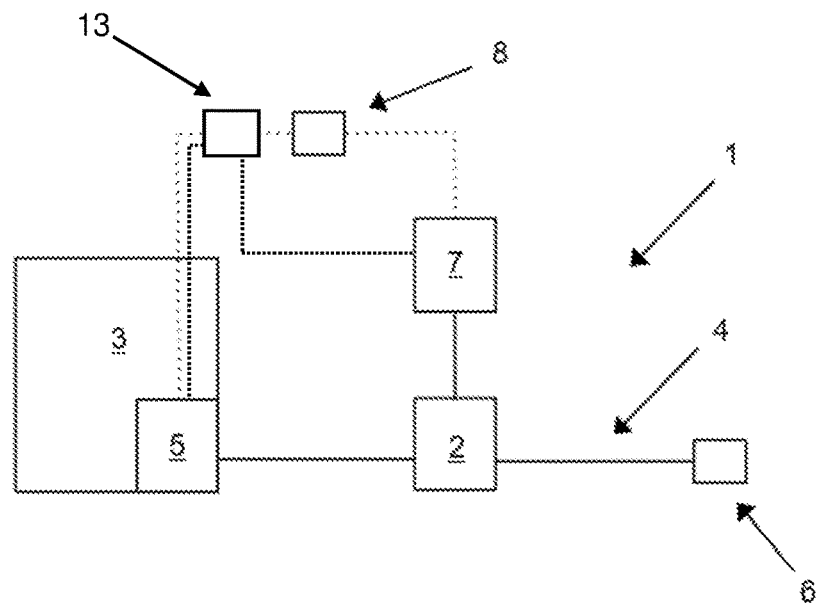
FIG. 1 a schematic diagram of a medium installation of a vehicle, comprising an emptying device according to an exemplary embodiment of the invention.

Referring now to the figures of the drawing in detail and first, in particular, to FIG. 1 thereof, there is shown a schematic representation of a medium installation 1 of a vehicle, such as a recreational vehicle, comprising an emptying device 2 according to one embodiment. The emptying device 2 is installed between a medium tank 3 and a medium line 4 to be emptied. This is done, for example, by disconnecting one end of the medium line 4 from the medium tank 3, interposing the emptying device 2 and, on the one hand, connecting the medium tank 3 to the emptying device 2 and, on the other hand, connecting the latter to the medium line 4.

The medium tank 3 may, by way of example, be a freshwater or wastewater tank and the medium line 4 to be emptied may be a freshwater or wastewater line. A feed pump 5 can be assigned to the medium tank 3, which is arranged inside the medium tank 3 and is used to convey the medium, here e.g. water, such as freshwater via the medium line 4 to an outlet tap 6.

A pressure medium source 7, such as a compressor, is arranged on the emptying device 2, which optionally introduces a gaseous pressure medium, in particular air, into the medium line 4 to empty it.

The feed pump 5 and the pressure medium source 7 are each connected via a positive pole line (dashed) and a ground line (dotted) to a DC power supply 13 of the vehicle for their electrical operation. A changeover switch 8 is arranged in the ground line connecting the feed pump 5 and the pressure medium source 7 (indicated in simplified form by the dotted and dashed lines) in order to alternately interrupt the respective ground line of the feed pump and the pressure medium source 7 or to connect it to the DC power supply.

Figure 2:
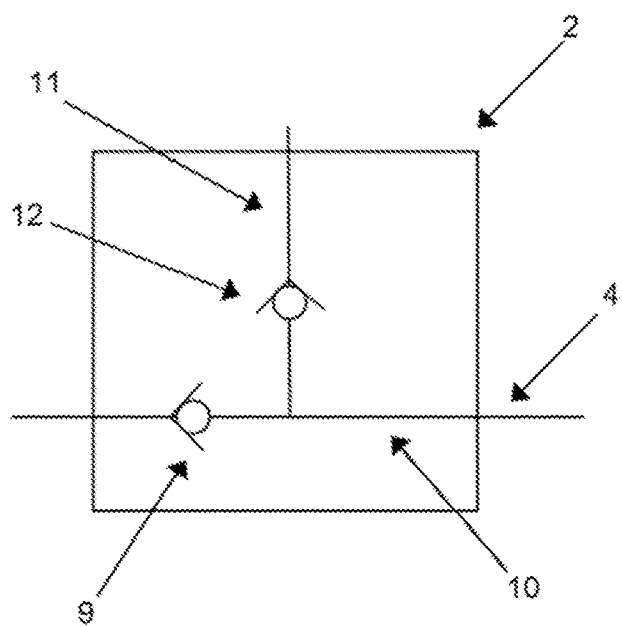
FIG. 2 is a schematic of an emptying device according to a possible embodiment of the invention.

FIG. 2 shows a detailed view of the emptying device 2 shown in FIG. 1, for example.

The emptying device 2 has a first non-return valve or check valve 9, which is arranged in a first connecting line 10 of the emptying device 2 between the medium tank 3 and the medium line 4 to be emptied. After the installation of the emptying device 2, the connecting line 10 is thus part of the medium line 4 to be emptied. The first non-return valve 9 is set up in such a way that it allows a flow of the medium from the medium tank 3 via the emptying device 2, more precisely the first connecting line 10, into the medium line 4 to be emptied, but blocks a reverse flow.

Furthermore, the emptying device 2 comprises a second connecting line 11, which, viewed in the direction of flow of the medium from the medium tank 3 towards the medium line 4 to be emptied, opens into the first connecting line 10 downstream of the first non-return valve 9 and is connected to it in a flow-conducting manner.

A second non-return valve or check valve 12 is arranged in the second connecting line 11, which allows the pressure medium to flow from the pressure medium source 7 via the second connecting line 11 in the direction of the medium line 4 to be drained, but blocks a reverse flow. This effectively prevents the medium from reaching the pressure medium source 7. The medium line 4 is then pressurized as required via the pressure medium source 7 and the second connecting line 11 in order to flush out the medium, i.e., to empty it of medium. This means that pressure medium is introduced into the medium line 4 in order to empty it.

The emptying device comprises a housing (indicated by the rectangle) that surrounds the first and second non-return valves 9, 12 and the first and second connecting lines 10, 11. This achieves a compact design of the emptying device 2 according to the invention.

The emptying device 2 according to the invention can therefore be easily retrofitted between the medium tank 3 and the medium line 4 connected to it in existing vehicle medium installations. This prevents a residual amount of medium from remaining in the medium line 4 and pathogens from spreading there or the medium from freezing over in winter.

The invention claimed is:

1. A medium installation for a vehicle, the medium installation comprising:

a medium tank, a medium line fluidically connected to said medium tank, and a feed pump for supplying a medium from the medium tank through said medium line;

an emptying device for emptying said medium line, said emptying device being connected between said medium tank and said medium line;

said emptying device having a first connecting line between said medium tank and said medium line to be emptied, and a first non-return valve in said first connecting line to permit a flow of a medium from said medium tank via said emptying device into said medium line and to block a reverse flow;

said emptying device having a second connecting line which, viewed in a direction of flow of the medium from said medium tank towards said medium line, is fluidically connected to open into said first connecting line downstream of said first non-return valve; and a pressure medium source being a compressor to be connected to said second connecting line and to pressurize said second connecting line with a gaseous pressure medium and to empty said medium line by the pressure medium;

said feed pump and said compressor being electrically connected to a DC circuit of the vehicle via a positive pole connection and a ground connection, and a changeover switch being connected in said ground connection of said feed pump and said pressure medium source, said changeover switch being configured to alternately interrupt the ground connection of said feed pump and connect said pressure medium source to said ground connection of the DC circuit or to connect the ground connection of said feed pump and interrupt the ground connection of said pressure medium source to the DC circuit.

2. The medium installation according to claim 1, further comprising a second non-return valve arranged in said second connecting line and configured to allow a flow of the pressure medium from said pressure medium source via said second connecting line in a direction of said medium line to be emptied, and to block a reverse flow.

3. The medium installation according to claim 2, wherein said emptying device comprises a housing which encloses said first and second non-return valves and said first and second connecting lines.

4. The medium installation according to claim 1, wherein said medium tank is a freshwater tank or a wastewater tank and said medium line is a freshwater line or a wastewater line.

5. The medium installation according to claim 1, wherein the gaseous pressure medium is air.

6. The medium installation according to claim 1, wherein said feed pump is disposed in said medium tank and is configured, upon actuation, to pump the medium via an outlet tap of said medium line.

7. A vehicle, comprising a medium installation according to claim 1.

8. The vehicle according to claim 7 being a recreational vehicle.

9. The vehicle according to claim 8 being a vehicle selected from the group consisting of a recreational vehicle, a coach, a motorhome, and a boat.

10. An emptying device for emptying a medium line of a medium installation in a vehicle, the emptying device comprising:

a first connecting line fluidically connected between a medium tank and the medium line to be emptied;

a first non-return valve in said first connecting line to permit a flow of a medium from the medium tank via the emptying device into the medium line and to block a reverse flow of the medium from the medium line to the medium tank;

a second connecting line which, viewed in a direction of flow of the medium from the medium tank towards the medium line to be emptied, is fluidically connected to open into said first connecting line downstream of said first non-return valve; and a pressure medium source being a compressor to be connected to said second connecting line and to pressurize said second connecting line with a gaseous pressure medium and to empty the medium line by the pressure medium;

wherein a feed pump for feeding the medium and said pressure medium source are electrically connected to a DC circuit of the vehicle via a positive pole connection and a ground connection, and a changeover switch is connected in said ground connection of said feed pump and said pressure medium source, and wherein said changeover switch is configured to alternately interrupt the ground connection of said feed pump and connect the ground connection of said pressure medium source to the DC circuit or to connect the ground connection of said feed pump and interrupt the ground connection of said pressure medium source to the DC circuit.

11. The medium installation according to claim 10, further comprising a second non-return valve in said second connecting line, said second non-return valve being configured to allow a flow of the pressure medium from said pressure medium source via said second connecting line in a direction of said medium line to be emptied, and to block a reverse flow.

12. The emptying device according to claim 11, further comprising a housing which encloses said first and second non-return valves and said first and second connecting lines.

13. The emptying device according to claim 10, wherein the medium tank is a freshwater tank or a wastewater tank and the medium line is a freshwater line or a wastewater line.

14. The emptying device according to claim 10, wherein the gaseous pressure medium is air.

15. The emptying device according to claim 10, wherein the feed pump is disposed in the medium tank and is configured, upon actuation, to pump the medium via an outlet tap of the medium line.

* * * * *